United States Patent
Chen

(10) Patent No.: US 7,133,053 B2
(45) Date of Patent: Nov. 7, 2006

(54) IMAGE SCALING DEVICE AND METHOD

(75) Inventor: Chang-Sheng Chen, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 74 days.

(21) Appl. No.: 10/950,394

(22) Filed: Sep. 28, 2004

(65) Prior Publication Data
US 2005/0140697 A1   Jun. 30, 2005

(30) Foreign Application Priority Data
Dec. 31, 2003   (TW) .............................. 92137800 A

(51) Int. Cl.
*G06T 11/00*   (2006.01)
(52) U.S. Cl. .................................................... 345/660
(58) Field of Classification Search ................ 348/581; 345/536, 660
See application file for complete search history.

(56) References Cited

U.S. PATENT DOCUMENTS 5,739,867 A * 4/1998 Eglit .......................... 348/581
6,064,444 A * 5/2000 Miyazaki et al. ........... 348/581
6,909,433 B1 * 6/2005 Minami ....................... 345/536

* cited by examiner

*Primary Examiner*—Almis Jankus
(74) *Attorney, Agent, or Firm*—Bacon & Thomas, PLLC

(57) ABSTRACT

An image sealing device has an input multiplexer, a line buffer, a vertical scaling processor for performing a vertical scaling process, a horizontal scaling processor for performing a horizontal scaling process, and an output multiplexer. The image scaling device can perform both horizontal and vertical upsealing or downscaling to the input image, and after the input image is processed, the output image is outputted to the display device.

17 Claims, 5 Drawing Sheets

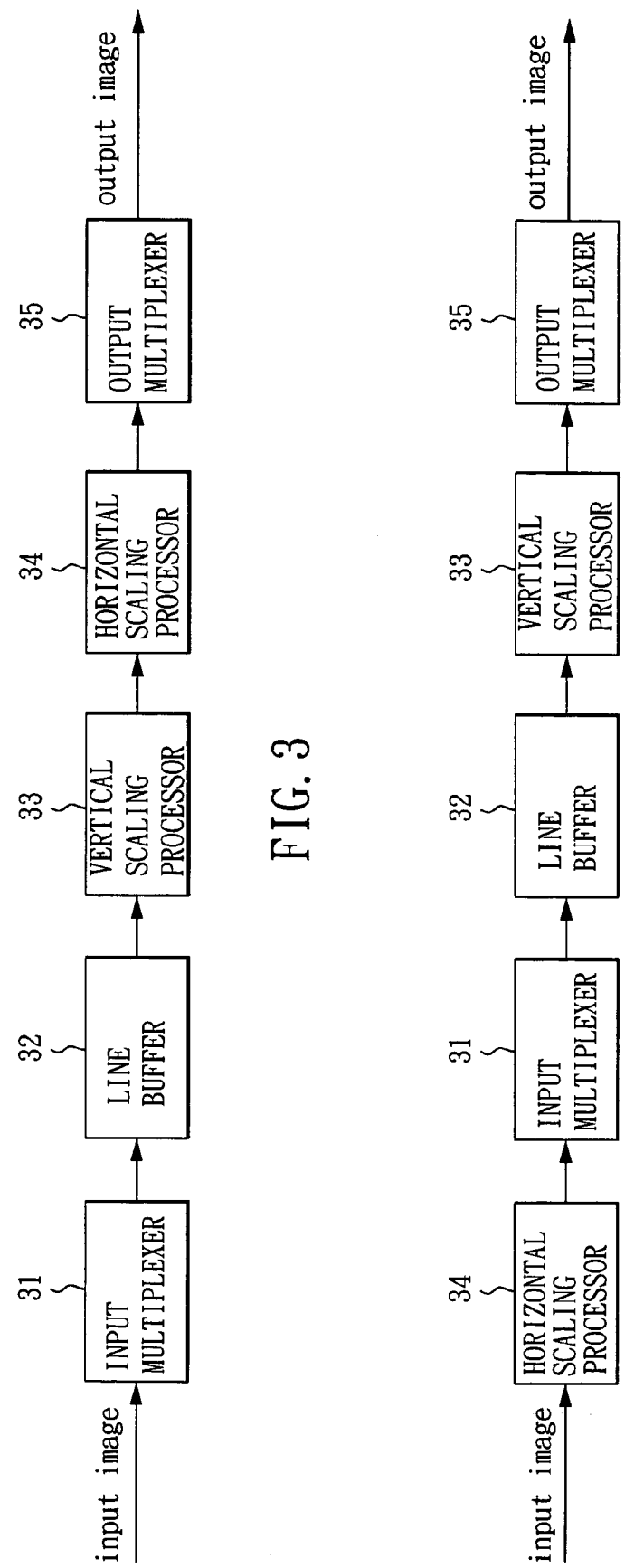

IMAGE SCALING DEVICE AND METHOD

BACKGROUND OF THE INVENTION

1. Field of the Invention

The present invention relates to an image scaling device and method and, more particularly, to an image scaling device and method for scaling two-dimensional image.

2. Description of the Related Art

Generally, an analog image signal (analog signal) received by the television and personal computer needs to be converted by an analog/digital converter (changing to a digital signal) and then be processed by an image processor to generate a digital image signal for output to a display device of the television or personal computer. However, the resolution (such as 640×480) of the analog image signal may differ from the resolution (such as 800×600) of the digital image signal displayed on the display device, or the resolution of the digital image signal may need to be adjusted due to a size difference of the display device (for example, a aspect ratio is changed from 4:3 to 16:9).

As shown in FIG. 1, U.S. Pat. No. 5,739,867, entitled "Method and apparatus for upscaling an image in both horizontal and vertical directions" discloses an image upscaling device 10, which comprises: an input data synchronizer 11, a line buffer 12, a FIFO 13, an interpolation line buffer 14, a vertical interpolator 15 and a horizontal interpolator 16, wherein a working frequency of the input data synchronizer 11 is named I-CLK; a working frequency of the line buffer 12, the FIFO 13, the interpolation line buffer 14, the vertical interpolator 15 and the horizontal interpolator 16 is named S-CLK; and the line buffer 12 receives image with the working frequency I-CLK in order to communicate with the input data synchronizer 11, and outputs image with the working frequency S-CLK in order to communicate with the FIFO 13. However, the image upscaling device 10 can only provide upscale capability without downscale ability, which is unsatisfactory to the user.

Therefore, it is desirable to provide an image scaling device to mitigate and/or obviate the aforementioned problems.

SUMMARY OF THE INVENTION

To avoid the above-mentioned defect, the present invention provides an image scaling device for scaling an input image and outputting an output image. The image scaling device includes: an input multiplexer controlled by a down/up signal for outputting the input image or horizontal dimensional image; a line buffer for buffering the image obtained from the input multiplexer; a vertical scaling processor for performing a vertical scaling process on the buffered image and outputting vertical dimensional image; a horizontal scaling processor controlled by a down/up signal for performing a horizontal scaling process on the vertical dimensional image or the input image and outputting the horizontal dimensional image; and an output multiplexer controlled by a down/up signal for outputting the horizontal dimensional image obtained from the horizontal scaling processor or the vertical dimensional image obtained from the vertical scaling processor as the output image.

To avoid the above-mentioned defect, the present invention provides an image scaling method for scaling an input image and outputting an output image. The image scaling method comprises: (A) outputting the input image or a horizontal dimensional image corresponding to a down/up signal; (B) buffering the input image or the horizontal dimensional image; (C) performing a vertical scaling process on the buffered image and outputting vertical dimensional image; (D) performing a horizontal scaling process on the vertical dimensional image or the input image according to the down/up signal and outputting the horizontal dimensional image; and (E) outputting the horizontal dimensional image or the vertical dimensional image according to the down/up signal as the output image.

Other objects, advantages, and novel features of the invention will become more apparent from the following detailed description when taken in conjunction with the accompanying drawings.

BRIEF DESCRIPTION OF THE DRAWINGS

FIG. 3 is a flow chart of the image scaling device performing horizontal upscaling according to the present invention;

FIG. 4 is a flow chart of the image scaling device performing horizontal downscaling according to the present invention;

DETAILED DESCRIPTION OF THE PREFERRED EMBODIMENT

Figure 1:
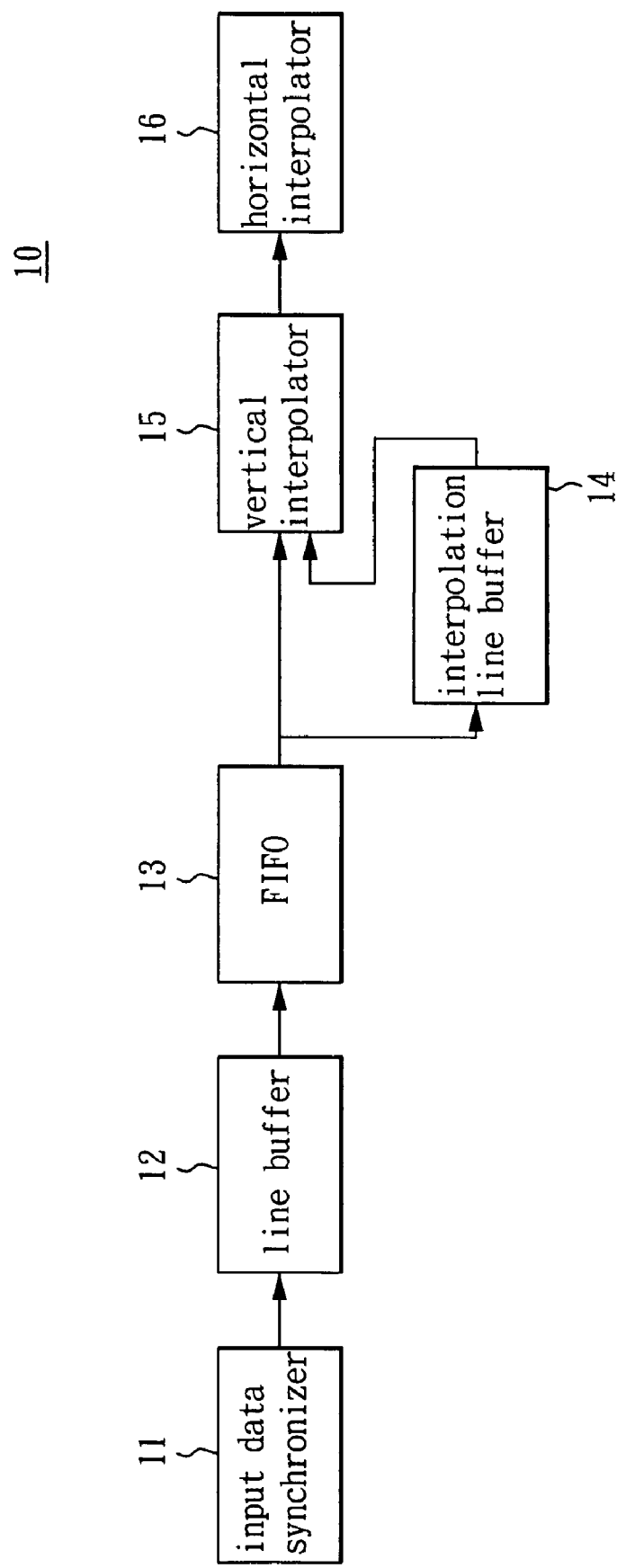
FIG. 1 is a functional block drawing of a prior art image upscaling device.
Figure 2:
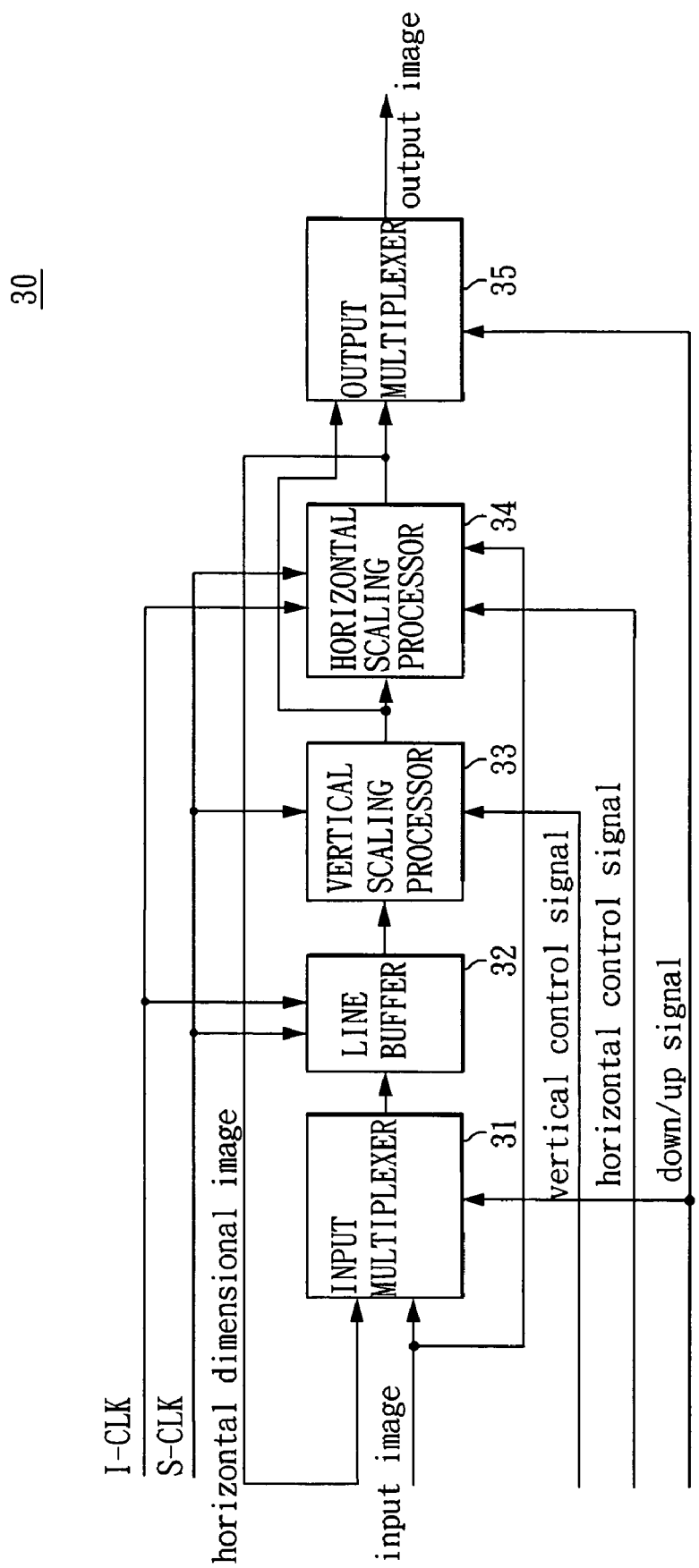
FIG. 2 is a functional block drawing of an image scaling device of the present invention.

Please refer to FIG. 2. FIG 2 is a functional block drawing of an image scaling device 30 of the present invention. The image scaling device 30 is able to perform horizontal scaling and vertical scaling processes to an input image and outputs an output image. There are four available image scaling processes, including: horizontal upscaling and vertical downscaling, horizontal downscaling and vertical downscaling, horizontal upscaling and vertical upscaling, and horizontal downscaling and vertical upscaling. By inputting a jump signal or a repeat signal to a vertical scaling processor 33 as a vertical control signal and a horizontal scaling processor 34 as a horizontal control signal to control the scaling processes, all four different image scaling processes can be achieved. The jump signal is used for indicating to the vertical scaling processor 33 or the horizontal scaling processor 34 to perform an image downscaling process. The repeat signal is used for indicating to the vertical scaling processor 33 or the horizontal scaling processor 34 to perform an image upscaling process. When the image scaling device 30 performs the horizontal upscaling process, a flow path for the input image is as shown in FIG. 3; when the image scaling device 30 performs the horizontal downscaling process, a flow path for the input image is as shown in FIG. 4. Since the two flow paths are different, a down/up signal ("up and down" signal) is used for controlling the input signal of an input multiplexer 31 and an output multiplexer 35 and controlling the procedural flow for the input image. Therefore, an image scaling operation of the image scaling device 30 can be indirectly controlled. Moreover, the specific manner of providing the jump signal and the repeat signal that is inputted by the vertical scaling processor 33 or the horizontal scaling processor 34 may be identical or not, depending on the actual requirement.

The image scaling device 30 of the present invention comprises: an input multiplexer 31, a line buffer 32, a vertical scaling processor 33, a horizontal scaling processor 34, and an output multiplexer 35, which are described in details hereinafter.

The input multiplexer 31 is used for outputting an image corresponding to the down/up signal (the input image or a horizontal dimensional image). When the down/up signal corresponds to horizontal downscaling, the image is horizontal dimensional image and obtained from the horizontal scaling processor 34; when the down/up signal corresponds to horizontal upscaling, the image is the input image (obtained from outside).

The line buffer 32 is used for buffering the image obtained from the input multiplexer 31, and for outputting lines of the image; the operating frequency of the line buffer 32 for outputting data is different from that for inputting data. When the image is inputted, the operating frequency of the line buffer 32 is I-CLK; when the lines of image are outputted, the operating frequency of the line buffer. 32 is S-CLK. In addition, the operation of the line buffer 32 is controlled by a line buffer controller (not shown).

Figure 5:
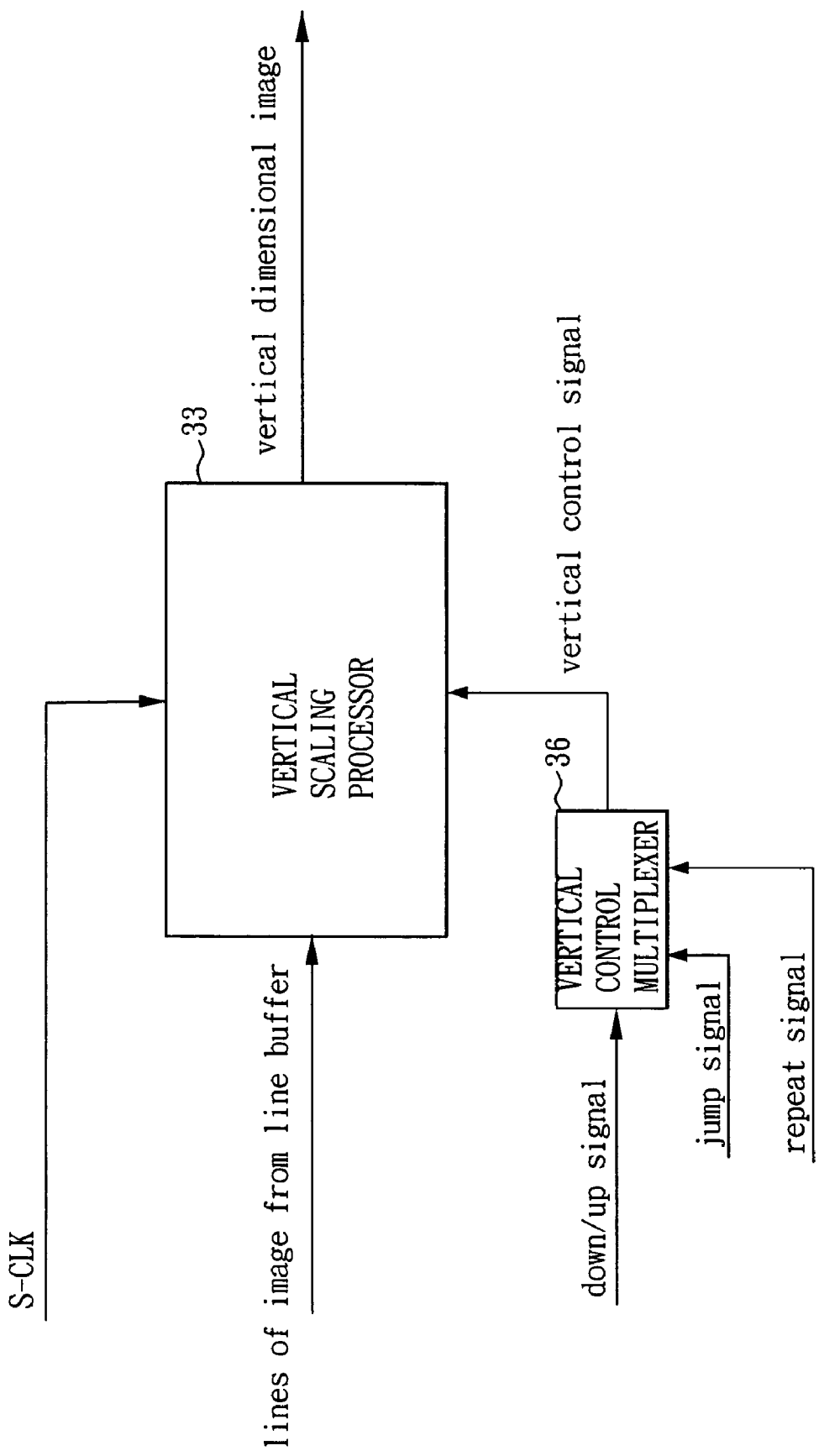
FIG. 5 is a schematic drawing of a vertical scaling processor.

The vertical scaling processor 33 is used for performing a vertical scaling process on the buffered image (corresponding to the input image or the horizontal dimensional image) obtained from the line buffer 32, to output vertical dimensional image. The line buffer 32 is used for providing at least one line of the buffered image to the vertical scaling processor 33 during the vertical scaling process. After the vertical scaling processor 33 finishes the scaling process, vertical dimensional image is generated. The vertical scaling processor 33 preferably employs N lines of the buffered image for the vertical scaling process, wherein N is a positive integer, and is preferably 4. The operating frequency of the vertical scaling processor 33 is S-CLK. As shown in FIG. 5, a vertical control multiplexer 36 is controlled by the down/up signal to output a vertical control signal (jump signal or repeat signal) to the vertical scaling processor 33, so that the vertical scaling processor 33 will perform the vertical scaling process (vertical upscaling or downscaling) to the buffered image. For example, when the down/up signal controls the vertical control multiplexer 36 to output the jump signal, the vertical scaling processor 33 performs the vertical downscaling process to the buffered image and then outputs vertical dimensioned image; when the down/up signal controls the vertical control multiplexer 36 to output the repeat signal, the vertical scaling processor 33 performs the vertical upscaling process to the buffered image and then outputs vertical dimensional image.

Figure 6:
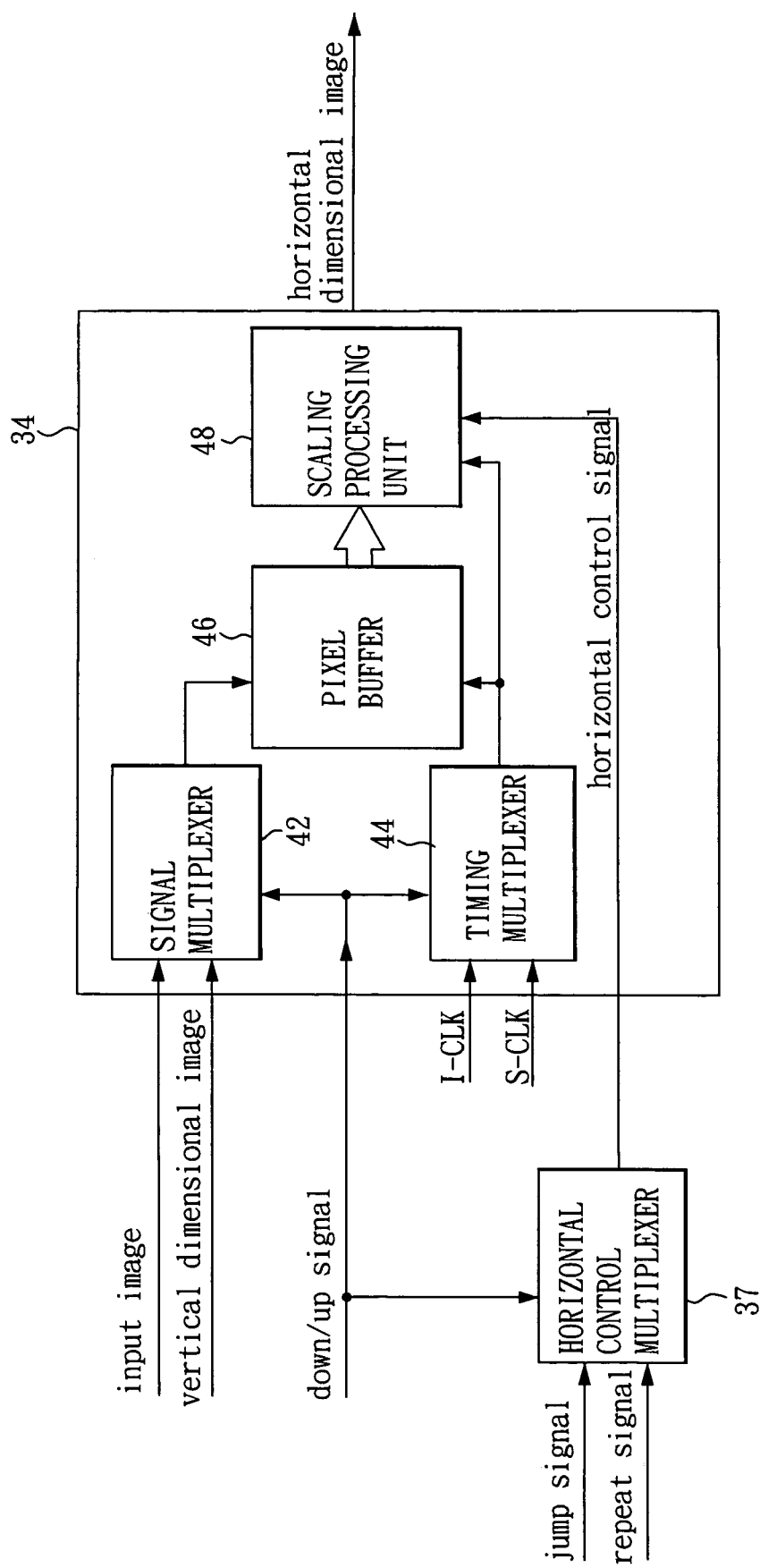
FIG. 6 is a schematic drawing of a horizontal scaling processor.

The horizontal scaling processor 34 is used for performing a horizontal scaling process on the input image or the vertical dimensional image obtained from the vertical scaling processor 33, so as to output the horizontal dimensional image, and its operating frequency differs for different horizontal scaling process modes. As shown in FIG. 6, the horizontal scaling processor 34 comprises a signal multiplexer 42, a timing multiplexer 44, a pixel buffer 46, and a scaling processing unit 48. The signal multiplexer 42 is controlled by the down/up signal to output the vertical dimensional image or the input image to the pixel buffer 46. The pixel buffer 46 is used for providing at least one pixel of the image to the scaling processing unit 48 during the horizontal scaling process. After the scaling processing unit 48 finishes the scaling process, horizontal dimensional image is generated. The scaling processing unit 48 preferably employs N pixels for the horizontal scaling process, wherein N is a positive integer, and is preferably 4. Since the horizontal scaling processor 34 performs the horizontal upscaling process after the line buffer 32, its operating frequency is S-CLK. When the horizontal scaling processor 34 performs the horizontal downscaling process before the line buffer 32, its operating frequency is I-CLK. Therefore, the timing multiplexer 44 is controlled by the down/up signal to output the operating frequency S-CLK, or operating frequency I-CLK, to the scaling processing unit 48, so that the horizontal scaling processor 34 can switch between these two operating frequencies. For example, if the down/up signal controls the horizontal control multiplexer 37 to output the jump signal, the horizontal scaling processor 34 performs the horizontal downscaling process to the input image, and its operating frequency is I-CLK. When the down/up signal controls the horizontal control multiplexer 37 to output the repeat signal, the horizontal scaling processor 34 performs the horizontal upscaling process to the vertical dimensional image, and its operating frequency is S-CLK.

The output multiplexer 35 is controlled by the down/up signal to output the output image. When the down/up signal indicates horizontal downscaling, the output image is the vertical dimensional image. When the down/up signal indicates horizontal upscaling, the output image is the horizontal dimensional image.

In order to perform two-dimensional image processing to the input image (including noise reduction in the input image or edge enhancement of the input image), a two-dimensional image processor can be added between the line buffer 32 and the vertical scaling processor 33 to satisfy image processing requirements.

In view of the foregoing, it is known that the image scaling device 30 can both upscale and downscale the input image. Furthermore, the image scaling device 30 only needs one line buffer 32, and therefore manufacturing costs can be reduced.

Although the present invention has been explained in relation to its preferred embodiment, it is to be understood that many other possible modifications and variations can be made without departing from the spirit and scope of the invention as hereinafter claimed.

What is claimed is:

1. An image scaling device for scaling an input image and outputting an output image, the image scaling device comprising:

an input multiplexer controlled by an up and down signal for outputting the input image or horizontal dimensional image;

a line buffer for buffering the image obtained from the input multiplexer and outputting lines of the image;

a vertical scaling processor for performing a vertical scaling process on the buffered image and outputting vertical dimensional image;

a horizontal scaling processor controlled by the up and down signal for performing a horizontal scaling process on the vertical dimensional image or the input image and outputting the horizontal dimensional image; and an output multiplexer controlled by the up and down signal for outputting the horizontal dimensional image obtained from the horizontal scaling processor or the vertical dimensional image obtained from the vertical scaling processor as the output image.

2. The image scaling device as claimed in claim 1, wherein if the up and down signal corresponds to a horizontal upscaling, the input multiplexer outputs the input image, the horizontal scaling processor inputs the vertical dimensional image, and the output multiplexer outputs the horizontal dimensional image.

3. The image scaling device as claimed in claim 1, wherein if the up and down signal corresponds to a horizontal downscaling, the horizontal scaling processor inputs the input image, the input multiplexer outputs the horizontal dimensional image, and the output multiplexer outputs the vertical dimensional image.

4. The image scaling device as claimed in claim 1, wherein if the up and down signal corresponds to a horizontal upscaling, the vertical scaling processor and horizontal scaling processor are operating under a second frequency.

5. The image scaling device as claimed in claim 1, wherein if the up and down signal corresponds to a horizontal downscaling, the horizontal scaling processor is operating under a first frequency, and the vertical scaling processor is operating under a second frequency.

6. The image scaling device as claimed in claim 1, further comprising a vertical control multiplexer which is controlled by the up and down signal to output a repeat signal or a jump signal to control the vertical scaling process.

7. The image scaling device as claimed in claim 1, further comprising a horizontal control multiplexer which is controlled by the up and down signal to output a repeat signal or a jump signal to control the horizontal sealing process.

8. The image scaling device as claimed in claim 1, wherein the horizontal scaling processor includes:
   a signal multiplexer controlled by the up and down signal for outputting the input image or the vertical dimensional image;
   a pixel buffer for buffering the image obtained from the signal multiplexer and then outputting pixels of the image; and
   a scaling processing unit for processing the pixels for the image and outputting the horizontal dimensional image according to the up and down signal.

9. The image scaling device as claimed in claim 8, wherein the scaling processing unit processes the pixels of the image with a second frequency or a first frequency according to the up and down signal.

10. An image scaling method for scaling an input image and outputting an output image, the image scaling method comprising:
    (A) outputting the input image or a horizontal dimensional image corresponding to an up and down signal;
    (B) buffering the input image or the horizontal dimensional image;
    (C) performing a vertical scaling process on the buffered image and outputting vertical dimensional image;
    (D) performing a horizontal scaling process on the vertical dimensional image or the input image according to the up and down signal and outputting the horizontal dimensional image; and
    (E) outputting the horizontal dimensional image or the vertical dimensional image according to the up and down signal as the output image.

11. The image scaling method as claimed in claim 10, wherein if the up and down signal corresponds to a horizontal upscaling, the input image is outputted in the step (A) and buffered in the step (B), the vertical dimensional image is performed with the horizontal scaling process in the step (D), and the horizontal dimensional image is outputted as the output image in the step (E).

12. The image scaling method as claimed in claim 10, wherein if the up and down signal corresponds to a horizontal downscaling, the input image is performed with a horizontal scaling process in the step (D) and outputted in the step (A), the horizontal dimensional image is buffered in the step (B), and the vertical dimensional image is outputted as the output image in the step (E).

13. The image scaling method as claimed in claim 10, wherein the step (C) further comprises:
    outputting a repeat signal or a jump signal according to the up and down signal to control the performance of the vertical scaling process.

14. The image scaling method as claimed I claim 10, wherein the step (D) further comprises:
    outputting a repeat signal or a jump signal according to the up and down signal to control the performance of the horizontal scaling process.

15. The image scaling method as claimed in claim 14, wherein the step (D) further comprises:
    inputting the input image line or the vertical dimensional image line as an image line data according to the up and down signal;
    buffering pixels of the image line; and processing the pixels of the image line with the horizontal scaling process and outputting the horizontal dimensional data.

16. The image scaling method as claimed in claim 15, wherein if the up and down signal corresponds to a horizontal upscaling, the image is the vertical dimensional image.

17. The image scaling method as claimed in claim 15, wherein if the up and down signal corresponds to a horizontal downscaling, the image is the input image.

* * * * *